(12) United States Patent
Rao et al.

(10) Patent No.: US 12,718,048 B2
(45) Date of Patent: Aug. 25, 2026

(54) CEMENTITIOUS SHEATHING PANEL WITH MOISTURE SENSOR AND SYSTEM AND METHOD FOR DETECTING MOISTURE WITHIN STRUCTURE

(71) Applicant: United States Gypsum Company, Chicago, IL (US)

(72) Inventors: Ajith M. Rao, Gurnee, IL (US); Suman Sinha Ray, Akron, OH (US); Derrick Hutchinson, Mundelein, IL (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 0 days.

(21) Appl. No.: 18/643,391

(22) Filed: Apr. 23, 2024

(65) Prior Publication Data

US 2024/0419931 A1 Dec. 19, 2024

Related U.S. Application Data

(60) Provisional application No. 63/508,313, filed on Jun. 15, 2023.

(51) Int. Cl.

| | |
|---|---|
| ***G06K 7/10*** | (2006.01) |
| ***E04C 2/04*** | (2006.01) |
| ***E04C 2/52*** | (2006.01) |
| ***G06K 19/07*** | (2006.01) |

(52) U.S. Cl.

CPC .......... *G06K 19/0717* (2013.01); *E04C 2/044* (2013.01); *E04C 2/526* (2013.01); *G06K 7/10445* (2013.01); *G06K 19/0723* (2013.01)

(58) Field of Classification Search

CPC .................................................. G06K 19/0717

See application file for complete search history.

(56) References Cited

U.S. PATENT DOCUMENTS

| | | | |
|---|---|---|---|
| 5,643,510 | A | 7/1997 | Sucech |
| 5,714,001 | A | 2/1998 | Savoly et al. |
| 6,342,284 | B1 | 1/2002 | Yu et al. |
| 6,410,118 | B1 | 6/2002 | Reicherts et al. |
| 6,632,550 | B1 | 10/2003 | Yu et al. |
| 6,774,146 | B2 | 8/2004 | Savoly et al. |
| 6,800,131 | B2 | 10/2004 | Yu et al. |
| 6,893,752 | B2 | 5/2005 | Veeramasuneni et al. |

(Continued)

FOREIGN PATENT DOCUMENTS

WO WO-2021261161 A1 * 12/2021 ........... G01N 27/225

*Primary Examiner* — Davetta W Goins
*Assistant Examiner* — Pameshanand Mahase
(74) *Attorney, Agent, or Firm* — Pradip Sahu; Greer, Burns & Crain, Ltd

(57) ABSTRACT

Embodiments of a system and a method for detecting moisture within a structure can use a cementitious panel including a moisture sensor. The moisture sensor can comprise a moisture-sensing, passive RFID tag. A reader can be used to periodically interrogate the RFID moisture-sensing tag to determine whether the RFID moisture-sensing tag has been subjected to moisture. Systems and methods for detecting moisture within a structure can use at least one such cementitious panel in a structural assembly, such as a roof assembly, for example, to help detect a leak in the roof assembly through periodic monitoring of the installed cementitious panel(s).

19 Claims, 5 Drawing Sheets

(56) References Cited

U.S. PATENT DOCUMENTS

| | | | |
|---|---|---|---|
| 7,244,304 B2 | 7/2007 | Yu et al. | |
| 7,425,236 B2 | 9/2008 | Yu et al. | |
| 7,758,980 B2 | 7/2010 | Yu et al. | |
| 7,964,034 B2 | 6/2011 | Yu et al. | |
| 8,070,895 B2 | 12/2011 | Engbrecht et al. | |
| 8,142,914 B2 | 3/2012 | Yu et al. | |
| 8,500,904 B2 | 8/2013 | Yu et al. | |
| 2002/0045074 A1 | 4/2002 | Yu et al. | |
| 2004/0231916 A1 | 11/2004 | Englert et al. | |
| 2005/0019618 A1 | 1/2005 | Yu et al. | |
| 2009/0206995 A1* | 8/2009 | Forster | G06K 19/07749 340/10.1 |
| 2010/0283584 A1* | 11/2010 | McAllister | B65C 11/006 340/10.1 |
| 2018/0002916 A1* | 1/2018 | Harrison | E04B 7/20 |
| 2018/0263827 A1* | 9/2018 | Omori | G06K 19/0717 |
| 2021/0302260 A1* | 9/2021 | Baggs | H04W 4/38 |
| 2022/0269452 A1* | 8/2022 | Vedaraj | B64U 10/13 |

* cited by examiner

24"
48"
24"
12"
24"
12"
IV
IV
54'
58'
25'
30'
30'
30'
30'

12"
24"
24"
24"
12"
12"
24"
12"
III
III
54
25
30
30
30
30
30
30
30
30

CEMENTITIOUS SHEATHING PANEL WITH MOISTURE SENSOR AND SYSTEM AND METHOD FOR DETECTING MOISTURE WITHIN STRUCTURE

CROSS-REFERENCE TO RELATED APPLICATION

This patent application claims the benefit of priority to U.S. Provisional Patent Application No. 63/508,313, filed Jun. 15, 2023, and entitled, "Cementitious Sheathing Panel with Moisture Sensor and System and Method for Detecting Moisture within Structure," which is incorporated in its entirety herein by this reference.

BACKGROUND

The present disclosure relates to a cementitious panel and, more particularly, to a system and method for detecting a leak or other moisture in an assembly of a structure which uses a cementitious panel having a moisture sensor.

Various assemblies of a structure, such as a roof, for example, are prone to moisture issues, and leaks are a predominant source of water intrusion into buildings. For example, the roof industry has employed different so-called "non-destructive" roof moisture evaluation techniques to assess the amount of roof moisture in a given roof assembly, including techniques using electric capacitance, infrared thermography, and nuclear hydrogen detection to perform roof moisture surveys.

An electric capacitance roof survey measures differences in a dielectric constant of a roof assembly, which can change in the presence of moisture. In an infrared thermography roof survey, an infrared camera is used to locate areas of temperature differences along the roof assembly that may be caused by the presence of water in the roof assembly. In nuclear hydrogen detection, devices measure the relative amount of hydrogen atoms present in a roof assembly with the areas having a higher concentration of hydrogen suggesting the presence of water.

Although the purpose of each of these known techniques is to find trapped water resulting from a leak in the roof assembly, none of these methods directly determines the presence of moisture in the roof assembly. Instead, these techniques indirectly detect the presence of water by assessing roof assembly properties that may (but not necessarily) be caused by the presence of water.

There is a continued need in the art to provide additional solutions for evaluating a structure for leaks or other unwanted moisture therein. For example, there is a continued need for techniques employing non-destructive means for measuring sub-surface moisture of a structural assembly.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a cementitious panel that includes a moisture sensor. In one embodiment, a cementitious panel includes a cementitious core, a pair of cover sheets, and a moisture sensor. The cementitious core is interposed between the pair of cover sheets. The moisture sensor is mounted to one of the pair of cover sheets.

In still another aspect of the present disclosure, embodiments of a moisture detection system for a structure are disclosed that include a cementitious panel having a moisture sensor. In one embodiment, a moisture detection system for a structure includes a cementitious panel, an RFID reader, a non-transitory, computer-readable medium, and a processor.

The cementitious panel includes a cementitious core, a pair of cover sheets, and a moisture sensor. The cementitious core is interposed between the pair of cover sheets. The moisture sensor is mounted to one of the pair of cover sheets and comprises a moisture-sensing, passive RFID tag having an antenna adapted to receive and transmit a signal. The passive RFID tag is configured to transmit a moisture value corresponding to an amount of moisture to which the passive RFID tag has been subjected. The RFID reader is configured to selectively interrogate the RFID tag to receive the moisture value from the RFID tag.

The non-transitory, computer-readable medium bears a moisture detection program. The processor is in operable arrangement with the RFID reader to receive the moisture value therefrom and in operable arrangement with the non-transitory, computer-readable medium. The processor is configured to execute the moisture detection program contained on the non-transitory, computer-readable medium. The moisture detection program includes a moisture analysis module configured to analyze the moisture value transmitted by the RFID tag to calculate a moisture level to which the RFID tag has been subjected.

In yet another aspect of the present disclosure, embodiments of a method of detecting moisture within a structure are described that include the step of detecting whether moisture is underneath an outer surface of a structural assembly using a moisture sensor mounted to a cementitious panel of the structural assembly. In one embodiment, a method of detecting moisture within a structure includes placing an RFID reader in proximity to a cementitious panel in a structural assembly of the structure. The cementitious panel includes a cementitious core, a pair of cover sheets, and a moisture sensor. The cementitious core is interposed between the pair of cover sheets. The moisture sensor is mounted to one of the pair of cover sheets and comprises a moisture-sensing, passive RFID tag. The RFID tag is interrogated using the RFID reader such that the RFID tag transmits a moisture value corresponding to an amount of moisture to which the RFID tag has been subjected.

Further and alternative aspects and features of the disclosed principles will be appreciated from the following detailed description and the accompanying drawings. As will be appreciated, the cementitious panels and the systems and techniques for detecting moisture within a structure disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

The present disclosure provides various embodiments of a cementitious panel with a moisture sensor, such as, a passive radio-frequency identification (RFID) transponder or tag, for example, that can enable the accurate measurement of the amount of moisture present at the sensing surface through non-destructive means via a noncontact reading device. Embodiments of a system and a method for detecting moisture within a structure (such as, moisture caused by a roof leak, for example) can include a cementitious sheathing panel constructed according to principles of the present disclosure. Systems and methods for detecting moisture within a structure following principles of the present disclosure can be used to provide a quick, non-destructive means for measuring sub-surface moisture of a structural assembly (including a roof assembly, for example) and to issue an alert that identifies particular locations of a structural assembly as being problem areas when the measured moisture exceeds a predetermined moisture level.

Figures 1, 2:
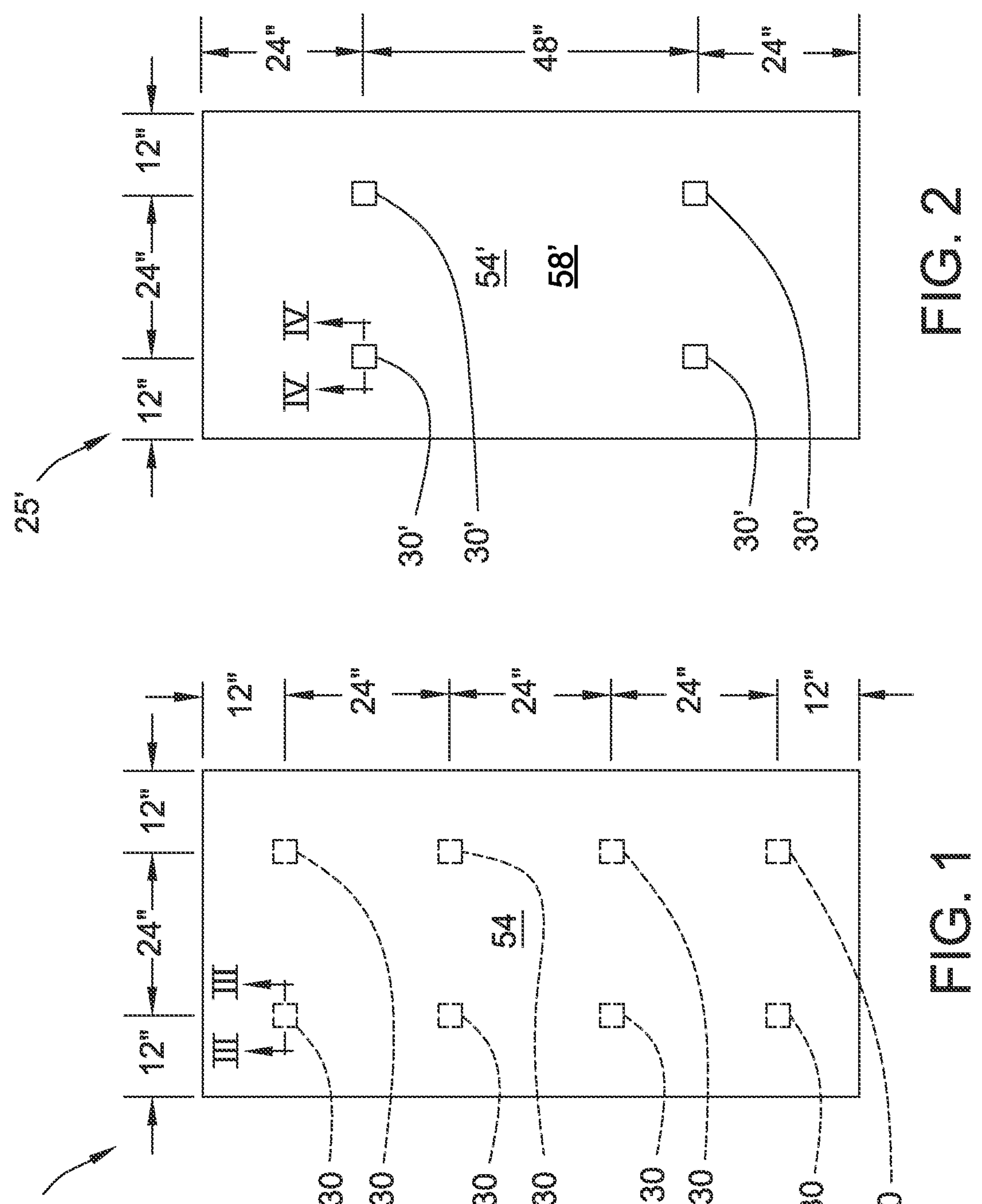
FIG. 1 is a top plan view of an embodiment of a cementitious sheathing panel constructed according to principles of the present disclosure.
FIG. 2 is a top plan view of another embodiment of a cementitious sheathing panel constructed according to principles of the present disclosure.
Figure 3:
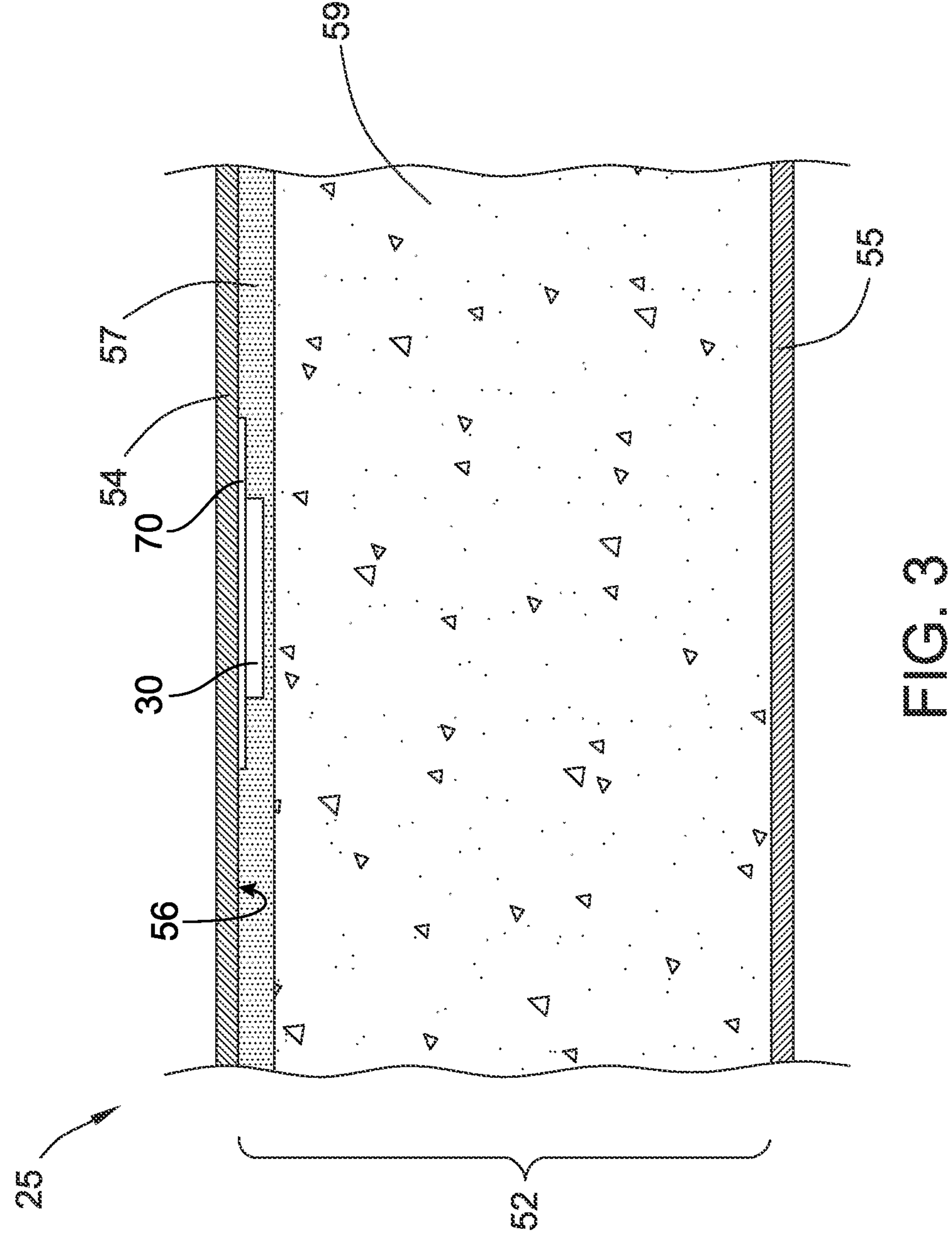
FIG. 3 is a cross-sectional view taken along line III-III in FIG. 1 of the cementitious sheathing panel of FIG. 1.

Turning now to the Figures, there is shown in FIGS. 1 and 3 an embodiment of a cementitious sheathing panel 25 constructed according to principles of the present disclosure that includes a plurality of moisture sensors 30, a cementitious core 52, and a pair of cover sheets 54, 55. Referring to FIG. 3, the cementitious core 52 is interposed between the pair of cover sheets 54, 55. Referring to FIG. 1, each moisture sensor 30 is mounted to one 54 of the pair of cover sheets 54, 55. In embodiments, the moisture sensors 30 can be disposed in regular spaced relationship to each other over the one 54 of the pair of cover sheets 54, 55 to which the moisture sensors 30 are mounted.

In the illustrated embodiment of FIG. 1, the cementitious sheathing panel 25 includes eight moisture sensors 30 disposed in regular spaced relationship to each other over the cover sheet 54 to which the moisture sensors 30 are mounted. In other embodiments, the number and/or spacing of the moisture sensors 30 can be varied. For example, referring to FIG. 2, another embodiment of a cementitious sheathing panel 25' constructed according to principles of the present disclosure is shown that includes four moisture sensors 30' disposed in regular spaced relationship to each other over the cover sheet 54'. In other embodiments, the cementitious sheathing panel 25 can include only one moisture sensor 30.

In embodiments, the cementitious sheathing panel 25 can include a number of moisture sensors 30 sufficient to achieve a desired sensor density. For example, in embodiments, the cementitious sheathing panel 25 includes at least one moisture sensor mounted to one of the pair of cover sheets in every four square feet of such cover sheet. In other embodiments, the cementitious sheathing panel 25 includes one moisture sensor 30 present in every four square feet of the cover sheet 54 of the cementitious sheathing panel 25. In other embodiments, the cementitious sheathing panel 25 includes two moisture sensors 30 present in every thirty-two square feet of the cover sheet 54 of the cementitious sheathing panel 25. In yet other embodiments, a different sensor density can be used to suit the intended use of the cementitious sheathing panel 25.

Referring to FIG. 3, in embodiments, a cementitious panel following principles of the present disclosure can have any suitable construction, such as, for example, those panels commercially-available from United States Gypsum, Chicago, Ill., under the trade names SHEETROCK®, SHEETROCK FIRECODE®, SECUROCK®, FIBEROCK.®, and DUROCK®. In embodiments, a cementitious panel constructed according to principles of the present disclosure can be comprised of any suitable inorganic core material intended for exterior applications. In particular, the core 52 can be comprised of any cementitious material, substance, or composition, along with any suitable additives. Non-limiting examples of materials that can be used in the cementitious core 52 include: Portland cement; sorrel cement; slag cement; fly ash cement; calcium alumina cement; water-soluble calcium sulfate anhydrite; calcium sulfate α-hemihydrate; calcium sulfate β-hemihydrate; natural, synthetic, or chemically-modified calcium sulfate hemihydrates, calcium sulfate dihydrate ("gypsum," "set gypsum," or "hydrated gypsum"); and mixtures thereof. As used herein, the term "calcium sulfate material" refers to any of the forms of calcium sulfate referenced above. In some embodiments, the cementitious core 52 comprises a calcium sulfate material, Portland cement, or a mixture thereof. In embodiments, the cementitious core 52 comprises gypsum.

In embodiments, the cementitious core 52 can comprise additives, such as any additives commonly used to produce cementitious articles (e.g., gypsum board or cement board). Suitable additives include, without limitation, structural additives such as mineral wool, continuous or chopped glass fibers (also referred to as fiberglass), perlite, clay, vermiculite, calcium carbonate, polyester, and paper fiber. Chemical additives include, e.g., foaming agents, fillers, accelerators, sugar, enhancing agents (e.g., phosphates, phosphonates, borates), retarders, binders (e.g., starch and latex), colorants, fungicides, and biocides. Examples of the use of some of these and other additives are described, for instance, in U.S. Pat. Nos. 6,342,284; 6,410,118; 6,632,550; 6,800,131; 5,643,510; 5,714,001; and 6,774,146, and U.S. Patent Application Publication Nos. 2004/0231916; 2002/0045074; and 2005/0019618, which disclosures are hereby incorporated herein by reference. In certain embodiments, the cementitious core further comprises metal fibers, cellulose fibers, mineral fibers, glass fibers, polymer fibers, carbon fibers, or a combination thereof.

In embodiments, the cementitious core 52 can comprise multiple layers, as is known in the art. For example, in embodiments, one or both of the cover sheets 54, 55 of the cementitious panel 25 can be treated with a relatively denser layer 57 of cementitious slurry (relative to a central core layer 59 of cementitious slurry from which the cementitious core 52 is made), often referred to as a "skim coat" in the art, if desired. In other embodiments, the cementitious core 52 can include any suitable concentrated layer that is formed from a concentrated slurry comprising an enhancing additive in which the enhancing additive is present in a more concentrated amount (by weight percentage) in the concentrated slurry than what is present in another layer forming the cementitious core 52.

In embodiments, the cementitious core 52 is covered by at least one cover sheet 54, 55 in an overlying manner relative to the core 52 on opposing faces thereof. In the illustrated embodiment, the cementitious core 52 is interposed between the pair of cover sheets 54, 55. The cover sheets 54, 55 can be any suitable cover sheet, such as, a paper cover sheet or a mat, for example. In some embodiments, at least one of the cover sheets 54, 55 comprises at least two substrates.

Various types of paper cover sheets are known in the art (e.g., manila, kraft, polymer, etc.) and all such types of paper cover sheets may be used in the present invention. Multi-ply papers can be used in various embodiments. In embodiments, the paper cover sheet can be treated with a chemical or physical additive to impart a property, such as waterproof, fire-proof, antifungal, and/or antimicrobial properties. In some embodiments, the cover sheet is a paper cover sheet having a weight of about 40 to about 65 lb./msf (pounds per thousand square feet).

In other embodiments, at least one of the cover sheets 54, 55 comprises a fibrous mat. In embodiments, the mat can comprise any suitable type of polymer fiber, mineral fiber, or combination thereof. Non-limiting examples of suitable fibers include glass fibers, polyamide fibers, polyaramide fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, etc.), and combinations thereof. In embodiments, the fibers of the mat can be hydrophobic or hydrophilic, coated or uncoated. The choice of fibers can be selected, at least in part, based upon the type of application in which the cementitious panel is intended to be used. For example, when the cementitious panel is used for applications that require heat or fire resistance, embodiments of a cementitious panel constructed according to principles of the present disclosure can include a fibrous mat having appropriate heat-resistant or fire-resistant fibers.

In embodiments, the fibrous mat can be woven or nonwoven. Non-woven mats can comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and combinations thereof. In embodiments, a suitable fibrous mat includes commercially-available mats used as facing materials for the cementitious panels.

In other embodiments, a cementitious panel constructed according to principles of the present disclosure can have any suitable construction fit for its intended purpose of being used in a given structural assembly. For example, additional details concerning a cementitious panel constructed according to principles of the present disclosure are described, for instance, in U.S. Pat. Nos. 6,893,752; 8,070,895; 6,342,284; 6,632,550; 7,244,304; 7,425,236; 7,758,980; 7,964,034; 8,142,914; 8,500,904, which disclosures are hereby incorporated herein by reference.

In embodiments, each moisture sensor 30 of the cementitious panel 25 is configured to transmit a moisture value corresponding to an amount of moisture to which the moisture sensor 30 has been subjected. In embodiments, the moisture sensor 30 can be any suitable sensor for detecting the presence of moisture/liquid in a structural assembly. In embodiments, the moisture sensor 30 comprises a passive RFID tag. The passive RFID tag 30 does not contain a battery or other power source, but rather power to operate the passive RFID tag 30 is supplied by a suitable RFID reader when it interrogates the passive RFID tag 30.

In embodiments, the passive RFID tag 30 can be any suitable size (such as, about four inches long by about one inch wide and about 0.01 inch thick. In other embodiments, the size of the passive RFID tag 30 can be different.

In embodiments, the passive RFID tag 30 can be mounted to one of the cover sheets 54, 55 using any suitable technique. For example, in embodiments, the passive RFID tag 30 includes a pressure-sensitive adhesive that is configured to adhere to the cover sheet 54 to which it is applied.

Figure 4:
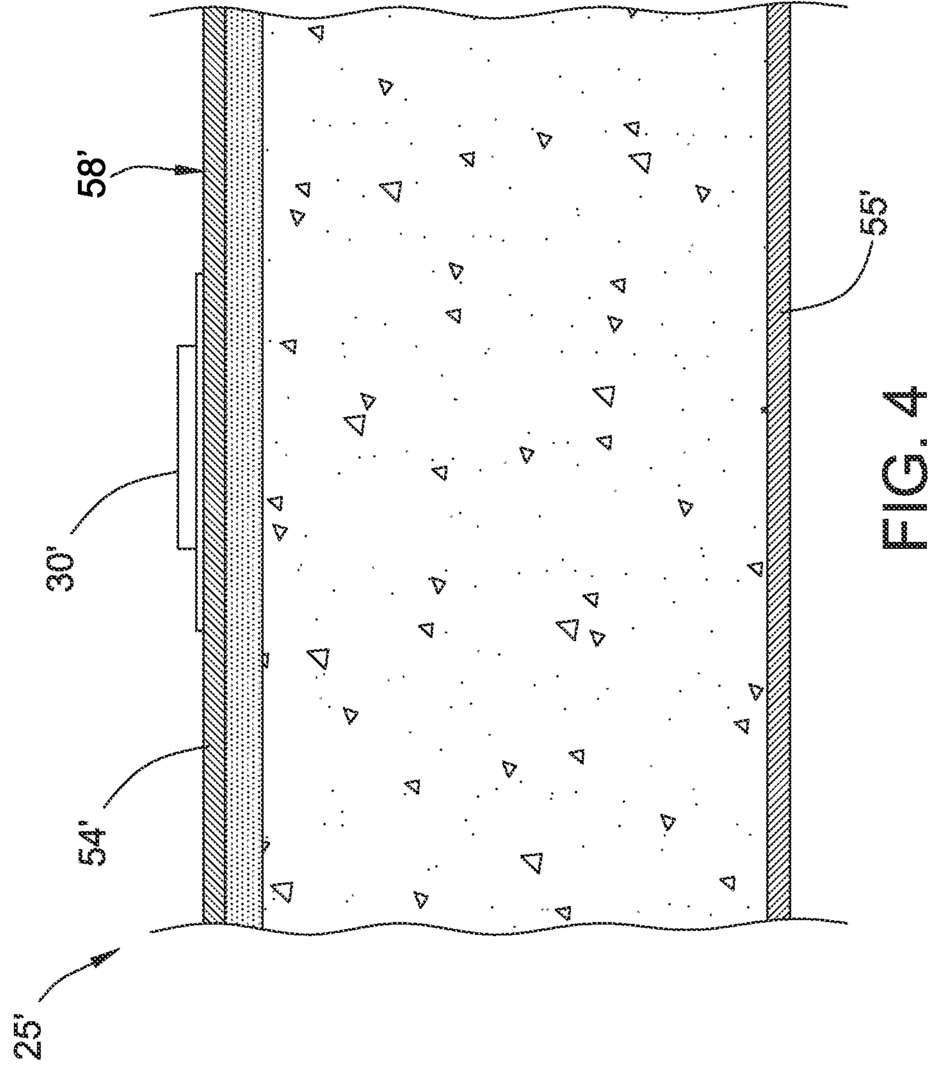
FIG. 4 is a cross-sectional view taken along line IV-IV in FIG. 2 of the cementitious sheathing panel of FIG. 2.

Referring to FIG. 3, the RFID tag 30 is applied to an inner surface 56 of one 54 of the pair of cover sheets 54, 55 such that the RFID tag 30 is interposed between the cementitious core 52 and the one 54 of the pair of cover sheets 54, 55. In other embodiments, the RFID tag 30' is applied to an exterior surface 58' of one 54' of the pair of cover sheets 54', 55', as is shown in the embodiment depicted in FIGS. 2 and 4, for example.

The cementitious panel 25 can be prepared by any suitable method. For example, when the passive RFID tags 30 are interposed between one 54 of the pair of cover sheets 54, 55 and the cementitious core 52, the RFID tags 30 can be applied to the web of cover sheet material 54 prior to, or concurrent with, the assembly of the constituent parts forming the cementitious panel 25. When the RFID tag 30 is applied to the exterior surface 58' of one 54' of the pair of cover sheets 54', 55', the application process can occur prior to, concurrent with, or after the assembly of the constituent parts forming the cementitious panel 25'.

The passive RFID tag 30 is configured to measure the amount of liquid present when the environment of the tag becomes wet. Referring to FIG. 3, in embodiments, the passive RFID tag 30 includes a substrate 70 made from a material that has a liquid wicking property. When the wicking substrate 70 comes into contact with liquid, the wicking property of the substrate 70 can convey the liquid to the body of the RFID tag 30 for the liquid to come into contact with the liquid sensing portion of the RFID tag 30. In other embodiments, the cover sheet 54 of the cementitious panel 25 to which the RFID tag 30 is mounted can be made from a material that has a moisture/fluid wicking property and is configured to direct the liquid with which it comes into contact to the RFID tag 30.

Figure 5:
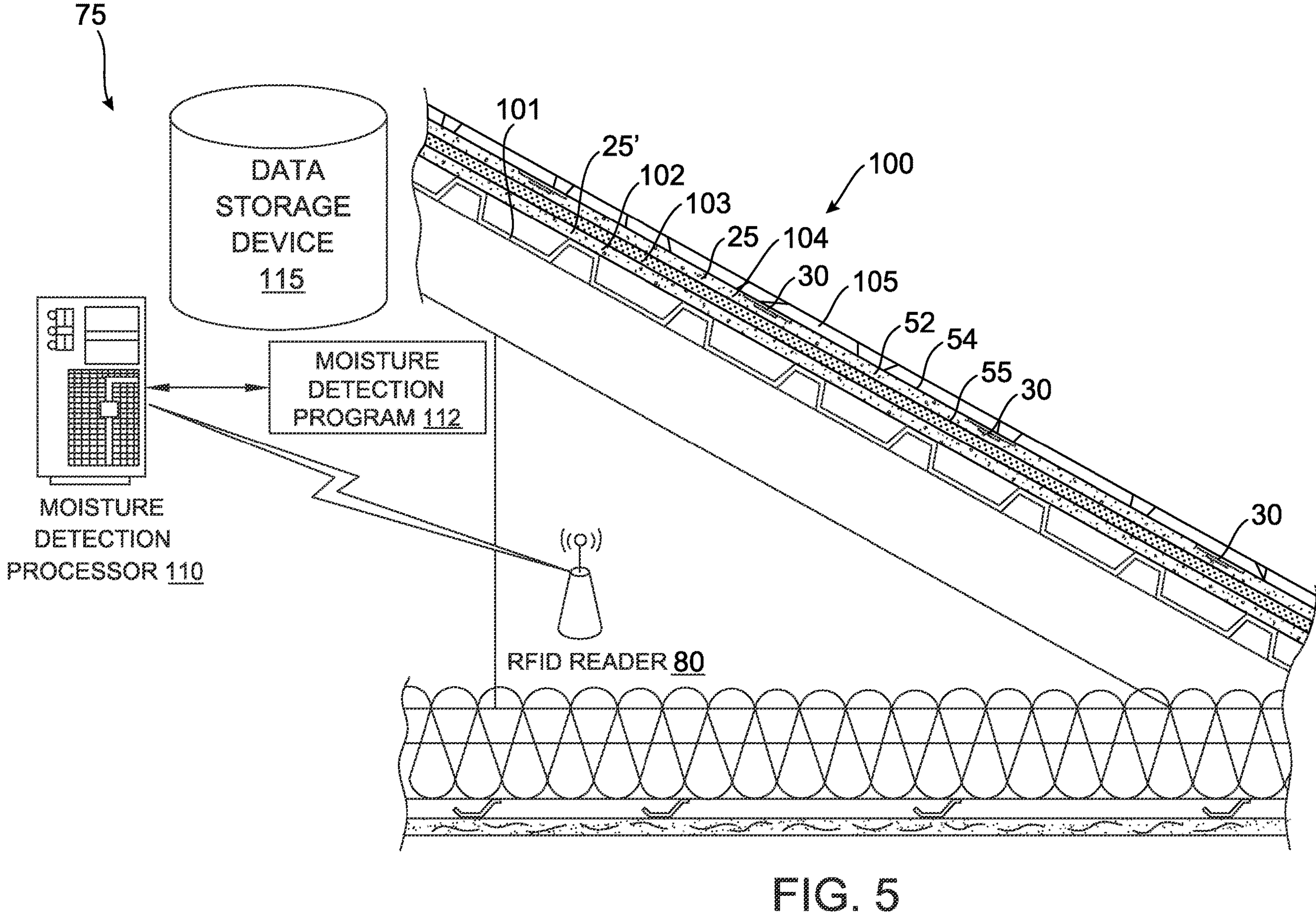
FIG. 5 is a schematic view of a moisture detection system for a structure constructed according to principles of the present disclosure and a sectional view of an embodiment of a roof assembly including a cementitious sheathing panel constructed according to principles of the present disclosure.
Figure 6:
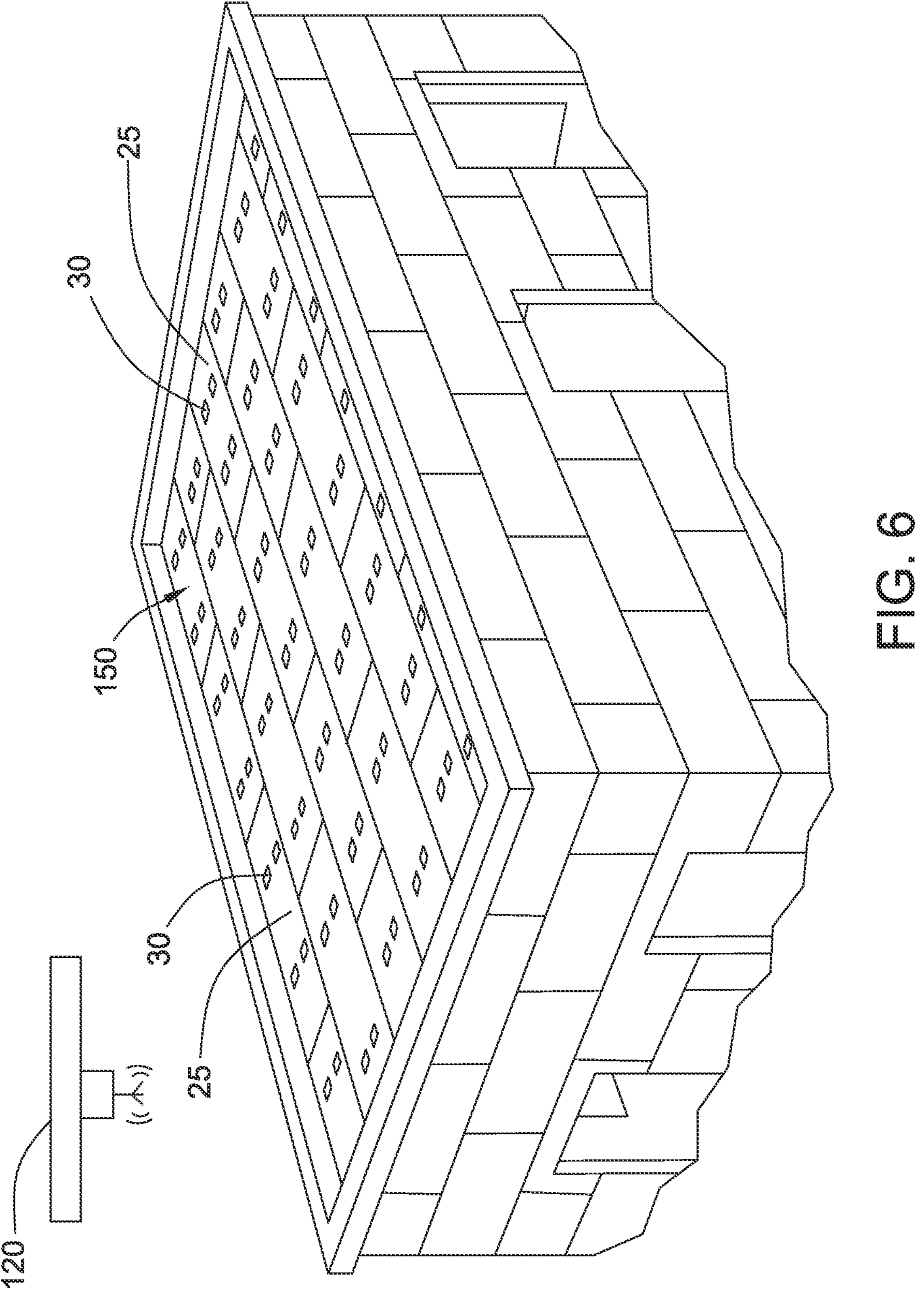
FIG. 6 is a perspective view of an embodiment of a roof assembly including a number of cementitious sheathing panels constructed according to principles of the present disclosure.

In embodiments, the passive RFID tag 30 comprises a moisture-sensing passive ultrahigh-frequency (UHF) RFID tag configured to act as a moisture sensor that can measure moisture conditions in a structural assembly, such as, a roof assembly 100, 150 as shown in FIGS. 5 and 6, for example. In embodiments, the passive RFID tag 30 can comprise a commercially-available moisture-sensing passive UHF RFID chip, such as one available from NXP Semiconductors, Impinj, or RFMicron, for example.

Each passive RFID tag 30 can include an antenna adapted to receive and transmit a signal. When radio waves from a suitable reader are received by the antenna of the passive RFID tag 30, the signal moves through a coiled portion of the antenna to generate a magnetic field. The passive RFID tag 30 draws power from the magnetic field to power an integrated circuit (IC) contained within the passive RFID tag 30. The IC of the passive RFID tag 30 can include a microchip configured to process information and to store information in a memory device of the passive RFID tag 30. When powered by the magnetic field, the passive RFID tag 30 can send the information encoded in the memory device of the passive RFID tag 30 via the antenna. In embodiments, the passive RFID tag 30 is compliant with the Electronic Product Code (EPC) Generation 2 standard.

The passive RFID tag 30 can contain a memory storage device (such as, non-volatile Electrically-Erasable Programmable Read-Only Memory (EEPROM)) for storing data. For example, in embodiments, the passive RFID tag 30 includes a memory storage device that includes a tag ID (TID) memory (e.g., sixty-four bits) used to store a unique identifier for that particular passive RFID tag 30, an electronic product code (EPC) memory (e.g., 128 bits of Electronic Product Code (EPC) memory) used to store a unique identifier for the cementitious panel 25 to which the particular passive RFID tag 30 is associated, and a moisture memory (e.g., 144 bits of moisture memory) for storing moisture value data.

In embodiments, the passive RFID tag 30 can include an antenna that acts as a resistor/inductor/capacitor (RLC) tuned circuit. In embodiments, one or a combination of the three RLC tuned circuit, can be used to enable the antenna to sense the moisture in its environment. The interdigitated capacitor experiences a change in capacitance when it becomes exposed to fluid/moisture. The dipole antenna registers this impedance change based upon the amount of fluid on the capacitor, which the IC of the RFID tag 30 translates into a moisture value that indicates the amount of fluid present.

In embodiments, the IC of the passive RFID tag 30, which can be powered by energy from RFID reader transmissions received by the antenna of the RFID tag 30, includes a self-tuning circuit that maintains the tuning of the passive RFID tag 30 under conditions in which the antenna's changing impedance would otherwise decrease or prohibit the ability to transmit a responding signal to the reader. In embodiments, the IC can be configured to transmit a moisture value based upon the amount of correction that the IC made to match itself to the changed impedance which can be correlated to the amount of moisture with which it comes into contact. Accordingly, the antenna of the passive RFID tag 30 can act as a moisture sensor in that the change in impedance of the antenna of the passive RFID tag 30 can be used to calculate a moisture level to which the passive RFID tag 30 has been subjected in its installed environment.

The moisture value information from the RFID tag 30 can be digitized and wirelessly communicated to any suitable RFID reader. In embodiments, a commercially-available RFID reader can be used with a standard UHF Gen 2 protocol READ command to obtain moisture value data from the passive RFID tag 30.

Referring to FIG. 5, an embodiment of a moisture detection system 75 for a structure constructed according to principles of the present disclosure is shown. The moisture detection system 75 includes a cementitious sheathing panel 25 incorporated into a roof assembly 100, an RFID reader 80, a non-transitory, computer-readable medium 112, and a processor 110. In embodiments, the roof assembly 100 can be constructed such that it includes at least one cementitious panel 25 constructed according to principles of the present disclosure. In other embodiments, the roof assembly 100 can have a different pitch, including comprising a flat roof assembly such as is shown in FIG. 6. In other embodiments, at least one cementitious panel 25 constructed according to principles of the present disclosure can be incorporated into another structural assembly of a structure, such as a wall assembly, for example.

In the illustrated embodiment, the roof assembly 100 includes a metal deck 101, a cementitious sublayer 102 comprising a plurality of cementitious panels 25' which do not include moisture sensors, an insulation layer 103, a cementitious outer layer 104 comprising a plurality of cementitious panels 25 constructed according to principles of the present disclosure, and an exterior layer 105. In embodiments, the insulation layer 103 can comprise any suitable insulation product, including, for example, a plurality of rigid foam insulation boards. In embodiments, the exterior layer 105 can include any suitable roofing product for providing a water-tight barrier, such as suitable shingles or waterproofing membrane, for example.

In embodiments, the roof assembly can include different layers of known roofing materials as will be appreciated by one skilled in the art. For example, in other embodiments, the metal deck 101 and/or the cementitious sublayer 102 can be omitted, and a plywood sublayer can be included.

The cementitious sheathing panel 25 can be any panel constructed in accordance with principles of the present disclosure. In the embodiment illustrated in FIG. 5, the cementitious sheathing panel 25 includes a cementitious core 52, a pair of cover sheets 54, 55, and a plurality of moisture sensors 30. The cementitious core 52 is interposed between the pair of cover sheets 54, 55. Each moisture sensor 30 is mounted to one 54 of the pair of cover sheets 54, 55 and comprises a moisture-sensing, passive RFID tag having an antenna adapted to receive and transmit a signal. Each passive RFID tag 30 is configured to transmit a moisture value corresponding to an amount of moisture to which the passive RFID tag 30 has been subjected. The RFID reader 80 is configured to selectively interrogate the RFID tags 30 to receive the respective moisture value from each RFID tag 30.

The non-transitory, computer-readable medium 112 bears a moisture detection program. The processor 110 is in operable arrangement with the RFID reader 80 to receive the moisture values therefrom and is in operable arrangement with the non-transitory, computer-readable medium 112. The processor 110 is configured to execute the moisture detection program contained on the non-transitory, computer-readable medium.

The moisture detection program 112 includes a moisture analysis module configured to analyze the moisture values transmitted by the RFID tags 30 to calculate a moisture level to which each RFID tag 30 has been subjected. In embodiments, the moisture detection program is configured to issue an alert message when the moisture level calculated by the moisture detection program exceeds a predetermined threshold.

Referring to FIG. 5, the RFID reader 80 can be configured to selectively interrogate each passive RFID tag 30 of each cementitious panel 25 in the roof assembly 100 to receive the moisture value from the respective passive RFID tag. In embodiments, the RFID reader 80 can comprise any suitable, commercially-available reader, such as an ultra-high frequency (UHF) RFID reader, for example. In embodiments, the RFID reader 80 includes a global positioning system (GPS). The GPS can be configured to generate location data for each passive RFID tag 30 interrogated by the RFID reader 80 and to transmit the location data to the processor 110 along with the other data collected from the RFID tag 30.

In embodiments, the RFID reader 80 comprises a drone 120 having an RFID reader mounted thereto (see FIG. 6). In embodiments, the RFID reader 80 can comprise any suitable, commercially-available drone and reader. In embodiments, the RFID reader 80 can have a range that is suitable for interrogating the RFID tags 30 in the structural assembly 100 over a desired distance from the roof assembly 100 itself (e.g., a one hundred foot range).

To read the information encoded on each of the passive RFID tags 30 of the cementitious sheathing panel 25 in the roof assembly 100, the RFID reader 80 can be used interrogate each tag 30 mounted to one 54 of the cover sheets 54, 55 of the cementitious sheathing panel 25 in the roof assembly 100. Each tag 30 can use the power generated by the magnetic field created in response to receiving the RFID reader signal through the antenna of the tag 30 to send a response back to the reader 80 that is configured to indicate the presence of moisture if the antenna of the passive RFID tag 30 has experienced a change in impedance as a result of being exposed to moisture/fluid.

In embodiments, the RFID reader 80 comprises a two-way radio transmitter-receiver configured to emit a signal to the tag 30 using an antenna. The tag 30 responds with the information written in its memory device. The RFID reader 80 is configured to decode the data encoded in the RFID chip of the tag 30 and to transmit the read results to the processor 110 which is suitably programmed with a moisture detection program 112 that includes a moisture analysis module configured to analyze the moisture value to calculate a moisture level to which the passive RFID tag 30 has been subjected. The RFID reader 80 can be used to interrogate each RFID tag 30 of the assembly 100 to capture the ID number of the particular passive RFID tag 30, which can also be linked to the specific location of the passive RFID tag 30 in the roof assembly 100 along with the moisture value readings.

The RFID reader 80 can be periodically operated to interrogate each RFID tag 30 in the roof assembly 100 to capture periodic readings in order to generate a history of moisture measurements which can be stored in the data storage device 115. The RFID reader 80 can be configured to automatically forward sensor measurements to the processor 110 each time a tag 30 is read.

In embodiments, the moisture detecting processor 110 is in operable arrangement with a non-transitory, computer-readable medium to execute the moisture detection program 112 contained thereon. The moisture detecting processor 110 is also operably arranged with the RFID reader 80 to receive moisture value data from the RFID reader 80. In embodiments, any suitable connection between the moisture detecting processor 110 and the RFID reader 80 can be used, such as either a wired connection or a wireless transmission. The moisture detecting processor 110 is configured to manipulate the moisture value data received from the RFID reader 80 and to convert that information into a moisture level using the program 112. The moisture level data generated using the moisture detection program 112 can be stored in the data storage device 115 which is operably arranged with the moisture detecting processor 110.

In embodiments, the moisture detecting processor 110 can comprise any suitable computing device, such as, a microprocessor, a mainframe computer, a digital signal processor, a portable computing device, a personal organizer, a device controller, a logic device (e.g., a programmable logic device configured to perform processing functions), a digital signal processing (DSP) device, or a computational engine within an appliance. In embodiments, the moisture detecting processor 110 includes one or more input devices (e.g., a keyboard and a mouse) and a display device.

The moisture detecting processor 110 can have one or more memory devices 115 associated therewith to store data and information. The one or more memory devices 115 can include any suitable type, including volatile and non-volatile memory devices, such as RAM (Random Access Memory), ROM (Read-Only Memory), EEPROM, flash memory, etc. In some embodiments, the memory device comprises a repository of moisture measurement data related to a given structural assembly. In embodiments, the memory device 115 can have a cloud-based platform. In one embodiment, the moisture detecting processor 110 is adapted to execute programming stored upon a non-transitory computer readable medium to perform various methods, processes, and modes of operations in a manner following principles of the present disclosure.

In embodiments, a moisture detection program 112 following principles of the present disclosure can be configured to implement an embodiment of a moisture detection system according to principles of the present disclosure. In embodiments, the moisture detection program 112 includes a graphical user interface that can be displayed by a display device. The graphical user interface can be used to facilitate the inputting of commands and data by a user to the moisture detection program 112 and to display outputs generated by the moisture detection program 112.

In embodiments, the moisture detection program 112 includes a mapping module configured to analyze the location data to generate a structural layout including a tag location for each passive RFID tag 30 of the structural assembly 100 using the location data received from the GPS of the RFID reader 80. In embodiments, the structural layout can include construction details relating to the structural assembly 100 and/or other assemblies of the structure in which the cementitious panel 25 is used.

In embodiments, the moisture detection program 112 is configured to issue an alert message when the moisture level of the structural assembly 100 exceeds a predetermined threshold. In some embodiments, the moisture detection program 112 can be configured to issue an alert that is displayed upon a display device via a graphical user interface, for example, when the moisture level exceeds a predetermined threshold. In other embodiments, the alert message can be sent via any suitable manner, such as via SMS/email to a predetermined recipient or recipients. In embodiments, the alert message can include location information identifying which of a plurality of passive RFID tags found in a given structural assembly have been subjected to fluid exceeding the predetermined threshold. In embodiments, the moisture detection system for a structure can include other components and devices, as will be appreciated by one skilled in the art.

The moisture detection program 112 can be stored upon any suitable computer-readable storage medium. For example, in embodiments, a moisture detection program 112 following principles of the present disclosure can be stored upon a hard drive, floppy disk, CD-ROM drive, tape drive, zip drive, flash drive, optical storage device, magnetic storage device, and the like.

In embodiments of a method of detecting moisture within a structure following principles of the present disclosure, a moisture detection system for a structure according to principles of the present disclosure is used to monitor a structural assembly (such as a roof assembly or a wall assembly, for example) for moisture/fluid within the structural assembly that exceeds a predetermined threshold. In embodiments, a method of detecting moisture within a structure following principles of the present disclosure can be used with any embodiment of a moisture detection system for a structure according to principles discussed herein.

In embodiments of a method of detecting moisture within a structure following principles of the present disclosure, the presence of moisture underneath an outer surface of a structural assembly is detected using a moisture sensor mounted to a cementitious panel. In one embodiment of a method of detecting moisture within a structure, a cementitious sheathing panel is installed in a structural assembly, such as, a roof assembly or a wall assembly, for example. The cementitious sheathing panel includes a cementitious core, a pair of cover sheets, and a moisture sensor. The cementitious core is interposed between the pair of cover sheets. The moisture sensor is mounted to one of the pair of cover sheets. The moisture sensor comprises a passive RFID tag. The passive RFID tag is interrogated such that the passive RFID tag transmits a moisture value corresponding to an amount of moisture to which the passive RFID tag has been subjected.

In one embodiment, a method of detecting moisture within a structure includes placing an RFID reader in proximity to a cementitious panel in a structural assembly of the structure. The cementitious panel includes a cementitious core, a pair of cover sheets, and a moisture sensor. The cementitious core is interposed between the pair of cover sheets. The moisture sensor is mounted to one of the pair of cover sheets and comprises a moisture-sensing, passive RFID tag. The RFID tag is interrogated using the RFID reader such that the RFID tag transmits a moisture value corresponding to an amount of moisture to which the RFID tag has been subjected.

In embodiments, the structural assembly includes a plurality of cementitious panels, each including at least one moisture-sensing, passive RFID tag configured to transmit a moisture value corresponding to an amount of moisture to which the RFID tag has been subjected. In at least some of such embodiments, the RFID reader includes a global positioning system (GPS) configured to generate location data for each RFID tag interrogated by the RFID reader. In at least some of such embodiments, the method further includes interrogating, using the RFID reader, the RFID tags of the plurality of cementitious panels of the structural assembly such that each such RFID tag transmits a moisture value corresponding to an amount of moisture to which the RFID tag has been subjected and the RFID reader generates location data for each such RFID tag interrogated by the RFID reader.

In embodiments, the passive RFID tag can be interrogated using any suitable technique. In embodiments, the passive RFID tag is interrogated by using a handheld RFID reader. In other embodiments, the passive RFID tag is interrogated by using a drone 120 having an RFID reader mounted thereto (see FIG. 6). In embodiments, any suitable drone can be used, such as one capable of carrying a RFID reader suitable for interrogating the passive RFID tag. In embodiments, the drone 120 carrying the RFID reader can be flown over the structural assembly 150 to interrogate all of the passive RFID tags 30 contained within the cementitious sheathing panels 125 of the structural assembly 150 in a convenient and quick manner. In embodiments, the drone 120 can be taken over a second structural assembly for performing a second interrogation sequence over the second structural assembly.

Embodiments of a method of detecting moisture within a structure following principles of the present disclosure can offer a quick, non-destructive way to monitor the integrity of a structural assembly to verify it maintains a satisfactory level of water impermeability. Such methods can be can be carried out using RFID readers located many feet away from the tags themselves such that the need for an inspector be in physical proximity to the structural assembly (such as by climbing upon a roof assembly) to visually inspect the structural assembly can be avoided. Furthermore, the passive RFID tags can be configured to transmit data through the layers of the structural assembly making it possible to receive moisture level data from within the structure itself.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cementitious panel comprising:

a cementitious core;

a pair of cover sheets, the cementitious core interposed between the pair of cover sheets;

a moisture sensor, the moisture sensor mounted to one of the pair of cover sheets, wherein the moisture sensor comprises a moisture-sensing passive ultrahigh-frequency RFID tag, the RFID tag including a body housing a liquid-sensing portion and a substrate made from a material that has a liquid-wicking property such that the substrate conveys liquid contacting the substrate toward the liquid-sensing portion of the body.

2. The cementitious panel according to claim 1, wherein the RFID tag is applied to an inner surface of the one of the pair of cover sheets such that the RFID tag is interposed between the cementitious core and the one of the pair of cover sheets.

3. The cementitious panel according to claim 1, wherein the RFID tag is applied to an exterior surface of the one of the pair of cover sheets.

4. The cementitious panel according to claim 1, wherein the RFID tag includes an antenna configured as a resistor/inductor/capacitor (RLC) tuned circuit.

5. The cementitious panel according to claim 4, wherein the RFID tag includes a pressure-sensitive adhesive configured to adhere to the one of the pair of cover sheets.

6. The cementitious panel according to claim 1, wherein the moisture sensor comprise a first moisture sensor, the cementitious panel further comprising:

at least one additional moisture sensor, each additional moisture sensor mounted to the one of the pair of cover sheets to which the first moisture sensor is mounted, the moisture sensors being disposed in regular spaced relationship to each other over the one of the pair of cover sheets to which the first moisture sensor is mounted.

7. The cementitious panel according to claim 6, wherein at least one moisture sensor is applied to the one of the pair of cover sheets in every four square feet of the one of the pair of cover sheets.

8. A moisture detection system for a structure, the system comprising:

a cementitious panel, the cementitious panel including a cementitious core, a pair of cover sheets, and a moisture sensor, the cementitious core interposed between the pair of cover sheets, and the moisture sensor mounted to one of the pair of cover sheets, wherein the moisture sensor comprises a moisture-sensing, passive ultrahigh-frequency RFID tag having an antenna adapted to receive and transmit a signal, the passive RFID tag configured to transmit a moisture value corresponding to an amount of moisture to which the passive RFID tag has been subjected, wherein the RFID tag includes a body housing a liquid-sensing portion and a substrate made from a material that has a liquid-wicking property such that the substrate conveys liquid contacting the substrate to the liquid-sensing portion of the body;

an RFID reader, the RFID reader configured to selectively interrogate the RFID tag to receive the moisture value from the RFID tag;

a non-transitory, computer-readable medium, the non-transitory, computer-readable medium bearing a moisture detection program;

a processor, the processor in operable arrangement with the RFID reader to receive the moisture value therefrom and in operable arrangement with the non-transitory, computer-readable medium, the processor configured to execute the moisture detection program contained on the non-transitory, computer-readable medium;

wherein the moisture detection program includes a moisture analysis module configured to analyze the moisture value transmitted by the RFID tag to calculate a moisture level to which the RFID tag has been subjected.

9. The moisture detection system according to claim 8, wherein the moisture detection program is configured to issue an alert message when the moisture level calculated by the moisture detection program exceeds a predetermined threshold.

10. The moisture detection system according to claim 8, wherein the RFID tag is applied to an inner surface of the one of the pair of cover sheets of the cementitious panel such that the RFID tag is interposed between the cementitious core and the one of the pair of cover sheets.

11. The moisture detection system according to claim 8, wherein the RFID tag is applied to an exterior surface of the one of the pair of cover sheets of the cementitious panel.

12. The moisture detection system according to claim 8, wherein the moisture sensor comprise a first moisture sensor, the cementitious panel further comprising:

at least one additional moisture sensor, each additional moisture sensor mounted to the one of the pair of cover sheets to which the first moisture sensor is mounted, the moisture sensors being disposed in regular spaced relationship to each other over the one of the pair of cover sheets to which the first moisture sensor is mounted.

13. The moisture detection system according to claim 8, wherein the RFID reader comprises a drone having an RFID reader mounted thereto.

14. The moisture detection system according to claim 13, wherein the RFID reader is configured to automatically forward the moisture value received from the RFID tag to the processor each time the RFID reader reads the RFID tag.

15. The system according to claim 8, further comprising:

a plurality of cementitious panels, each of the cementitious panels including at least one moisture-sensing, passive RFID tag configured to transmit a moisture value corresponding to an amount of moisture to which the RFID tag has been subjected;

wherein the RFID reader includes a global positioning system (GPS), the GPS being configured to generate location data for each RFID tag interrogated by the RFID reader and to transmit the location data to the processor;

wherein the moisture detection program includes a mapping module configured to analyze the location data to generate a structure layout including a tag location for each RFID tag using the location data from the RFID reader.

16. A method of detecting moisture within a structure, the method comprising:

placing an RFID reader in proximity to a cementitious panel in a structural assembly of the structure, the cementitious panel including a cementitious core, a pair of cover sheets, and a moisture sensor, the cementitious core interposed between the pair of cover sheets, and the moisture sensor mounted to one of the pair of cover sheets, wherein the moisture sensor comprises a moisture-sensing, passive ultrahigh-frequency RFID tag, wherein the RFID tag includes a body housing a liquid-sensing portion and a substrate made from a material that has a liquid-wicking property such that the substrate conveys liquid contacting the substrate toward the liquid-sensing portion of the body;

interrogating, using the RFID reader, the RFID tag such that the RFID tag transmits a moisture value corresponding to an amount of moisture to which the RFID tag has been subjected.

17. The method according to claim 16, wherein interrogating the RFID tag is performed using a handheld RFID reader.

18. The method according to claim 16, wherein interrogating the RFID tag is performed using a drone having an RFID reader mounted thereto.

19. The method according to claim 16, wherein the structural assembly includes a plurality of cementitious panels, each of the cementitious panels including at least one moisture-sensing, passive RFID tag configured to transmit a moisture value corresponding to an amount of moisture to which the RFID tag has been subjected, and wherein the RFID reader includes a global positioning system (GPS), the GPS being configured to generate location data for each RFID tag interrogated by the RFID reader, and the method further comprising:

interrogating, using the RFID reader, the RFID tags of the plurality of cementitious panels of the structural assembly such that each such RFID tag transmits a moisture value corresponding to an amount of moisture to which the RFID tag has been subjected and the RFID reader generates location data for each such RFID tag interrogated by the RFID reader.

* * * * *